United States Patent [19]
Thompson

[11] Patent Number: 5,281,253
[45] Date of Patent: Jan. 25, 1994

[54] MULTISTAGE MEMBRANE CONTROL SYSTEM AND PROCESS

[75] Inventor: David R. Thompson, Grand Island, N.Y.

[73] Assignee: Praxair Technology, Inc., Danbury, Conn.

[21] Appl. No.: 1,131

[22] Filed: Jan. 6, 1993

[51] Int. Cl.⁵ .......................................... B01D 53/22
[52] U.S. Cl. .......................................... 95/22; 95/23; 95/45; 95/54; 96/9; 55/210
[58] Field of Search .............................. 55/16, 18–21, 55/68, 158

[56] References Cited

U.S. PATENT DOCUMENTS

| | | | |
|---|---|---|---|
| 4,119,417 | 10/1978 | Heki et al. | 55/16 X |
| 4,130,403 | 12/1978 | Cooley et al. | 55/16 |
| 4,140,499 | 2/1979 | Ozaki et al. | 55/16 X |
| 4,264,338 | 4/1981 | Null | 55/16 |
| 4,397,661 | 8/1983 | King et al. | 55/158 |
| 4,421,529 | 12/1983 | Revak et al. | 55/21 X |
| 4,537,606 | 8/1985 | Itoh et al. | 55/158 |
| 4,806,132 | 2/1989 | Campbell | 55/16 |
| 4,857,082 | 8/1989 | DiMartino, Sr. et al. | 55/16 |
| 5,053,058 | 10/1991 | Mitariten | 55/18 X |
| 5,064,446 | 11/1991 | Kusuki et al. | 55/16 |
| 5,102,432 | 4/1992 | Prasad | 55/16 |
| 5,169,412 | 12/1992 | Prasad et al. | 55/16 |
| 5,185,014 | 2/1993 | Prasad | 55/16 |
| 5,205,842 | 4/1993 | Prasad | 55/16 |

OTHER PUBLICATIONS

A technical paper entitled "Nitrogen Production Using Membranes" presented at a symposium at Antwerp, Belgium, by Thompson et al. on Sep. 10–15, 1989.

*Primary Examiner*—Robert Spitzer
*Attorney, Agent, or Firm*—Chung K. Pak

[57] ABSTRACT

The invention relates to the control of multistage fluid separation processes and systems. The processes and systems employ at least one recycle compressor or pump in conjunction with their associated controlling system to separate a fluid mixture in an efficient manner during off demand or turndown conditions. The operation of at least one recycle compressor or pump is controlled so as to maintain the pressure in the permeate side or sides at a set value, thus maintaining the desired pressure ratio across the multistage membrane and obtain the desired, reduced power consumption during off demand or turn-down conditions.

8 Claims, 5 Drawing Sheets

MULTISTAGE MEMBRANE CONTROL SYSTEM AND PROCESS

FIELD OF THE INVENTION

The invention relates, in general, to multi-stage membrane control systems and processes useful for separating fluid under variable demand conditions and, in particular, to multi-stage membrane control systems and processes useful for separating gas under variable demand conditions.

BACKGROUND OF THE INVENTION

Permeable membrane systems have been increasingly employed in various fluid separation process. In such separation processes, a fluid mixture is brought into contact with the surface of the membrane in order to permeate the more readily permeable component of the fluid mixture through the membrane. As the more readily permeable component is withdrawn as a permeate stream, the less readily permeable component of the fluid mixture is recovered or removed as a non-permeate stream.

Significant factors in the design and overall efficiency of membrane systems are the total membrane surface area required for a given fluid separation and the partial pressure difference across the membrane that is required to obtain a desired product quantity and quality, which reflect the membrane's permeability and selectivity (or separation factor) characteristics respectively. The design of practical membrane systems requires optimization of the trade-offs between membrane surface area and said partial pressure differences. Thus, the grater the partial pressure difference, or driving force, across the membrane, the less is the membrane surface area required for a given fluid separation. This necessitates the use of more expensive pumping equipment and higher pump operating costs, but enables membrane equipment costs to be kept relatively low. If, on the other hand, a lower driving force is employed, more membrane surface area is required, and the relative costs of the various aspects of the overall system and operation would change accordingly.

Membrane systems are usually designed and optimized for full capacity, steady constant flow conditions, i.e., design conditions, that are not always fully utilized in practice. Under operating conditions other than the design conditions, different combinations of optimum operating conditions will prevail with respect to membrane area versus partial pressure differences because fluid separation applications for which membrane systems are desirable typically do not run under steady flow conditions. The demand from the membrane system will often vary in terms of product quantity and/or quality. For example, product demand for nitrogen gas from an air separation membrane system can vary significantly in a twenty-four hour period in terms of nitrogen flow rate and/or purity required. This varying product demand dictates that the membrane systems be designed to operate efficiently during off demand or turn-down conditions.

Several techniques have been used or proposed in attempt to operate membrane systems efficiently during the off demand or turn-down conditions. U.S. Pat. No. 4,806,132 discusses a number of techniques, which have been previously employed to operate membrane systems during off demand or turn-down conditions. These previous techniques involve reducing the flow of a non-permeate product stream by increasing the permeation of a greater amount of a fluid feed mixture, by shutting down a portion of the available membrane surface area or by using a surge tank to unload the membrane system. Due to their inefficient use of the available membrane surface area and power, however, this patent decides to reduce the flow of a feed stream during the off demand or turn-down conditions to operate membrane systems efficiently. The flow of a feed stream into the membrane system is controlled by adjusting the operation of a feed compressor located at the inlet line of the membrane system with controlling means.

U.S. Pat. No. 4,857,082 discusses in columns 1 and 2, inter alia, U.S. Pat. No. 4,397,662 which discloses a technique for operating a membrane system under turn-down conditions. The technique is indicated to involve removing membrane area by automatically valving off a portion of the membrane modules at predetermined production levels. To achieve this result, the membrane system is indicated to utilize a complex design involving additional valves, piping, instrumentation, etc. This design is indicated to be capital intensive due to the use of several smaller modular membrane units in parallel. Thus, the intent of U.S. Pat. No. 4,857,082 is to use a series of valves and control units located around membrane units to effectively control the differential pressure across the membrane to follow the changes in product demand or feed flow. This scheme is particularly adaptable to processes where the permeate gas is the desired product.

None of the techniques discussed above, however, is directed to control systems and processes useful for multi-stage membrane systems having at least three membrane stages and at least one recycle compressor, which are capable of recovering a high purity non-permeate product stream. Such multi-stage membrane systems are becoming increasingly important since they could produce, for example, high purity nitrogen without employing a deoxo unit. Therefore, there is a genuine need for control systems and processes which are useful for operating multi-stage membrane systems having at least three membrane stages and at least one recycle compressor during off demand or turn-down conditions.

SUMMARY OF THE INVENTION

According to the present invention, the above genuine need is met by utilizing a multi-stage permeable membrane system having the following features:

(a) at least three membrane units, with at least two of said at least three membrane units being connected in series, said at least three membrane units each comprised of a membrane having non-permeate and permeate sides, said membrane being capable of permeating at least one fluid component of the fluid mixture from the non-permeate side to the permeate side;

(b) fluid inlet means for introducing the fluid mixture into the non-permeate side of any one of said at least three membrane units;

(c) product outlet means for withdrawing product fluid from the non-permeate side of the second, third and/or last membrane unit in series;

(d) recycle conduit means selected from the group consisting of a first recycle conduit for passing fluid from the permeate side of said third membrane unit and/or said last membrane unit to the non-permeate side of at least one of said membrane units and a second recycle conduit for passing fluid from the permeate side of said second membrane unit to the non-permeate side of said third membrane unit and then passing fluid from the non-permeate side of said third membrane unit to the non-permeate side of at least one of said membrane units;

(e) recycle compressor or pumping means for pumping or compressing fluid in said first recycle conduit or in said second recycle conduit;

(f) control means for controlling or adjusting the operation of said recycle compressor or pumping means;

(g) means for sensing and/or monitoring the pressure, flow rate and/or purity of fluid in said first or second recycling conduit means; and (h) at least one process control system adapted to receive a process variable signal corresponding to the sensed and/or monitored pressure, flow rate and/or purity of fluid in said first or second recycling conduit means from said means for sensing and/or monitoring and to transmit a corresponding output signal to said control means for adjusting the operation of said recycle compressor or pumping means to vary the Capacity of said recycle compressor or pumping means to comport with varying product fluid demand conditions, whereby a constant pressure or a substantially constant pressure can be maintained at the permeate side of said second, third and/or last membrane unit.

The multi-stage permeable membrane system may also comprise an additional compressor or pumping means for compressing or pumping fluid in said fluid inlet means; additional control means for adjusting the operation of said additional compressing or pumping means; and means for sensing and/or monitoring the pressure, flow rate and/or purity of product fluid in said product outlet means. The process control system above is also adapted to receive a process variable signal corresponding to the sensed and/or monitored pressure, flow rate and/or purity of product fluid in said product outlet means from said means for sensing and/or monitoring and to transmit a corresponding output signal to said additional control means for adjusting the operation of said additional compressor or pumping means to increase or decrease the flow rate and/or pressure of the fluid mixture in said fluid inlet means to comport with varying product fluid demand conditions.

The multi-stage permeable membrane systems having the above features can be used in a fluid separation process to recover, among other things, nitrogen, dry gas, hydrogen, oxygen, argon, etc. By using the above features, the available membrane surface area can be fully utilized or substantially fully utilized in multi-stage membrane systems even under the varying product fluid demand conditions.

BRIEF DESCRIPTION OF THE DRAWINGS

The invention is hereinafter described in detail with reference to the accompanying drawings in which.

As shown by above FIGS. 1-3, there are several preferred multi-stage membrane systems for separating fluid, such as air. These preferred embodiments in no way preclude other multi-stage membrane systems which will become apparent or obvious to those skilled in the art after reading this disclosure.

DETAILED DESCRIPTION OF THE INVENTION

The invention relates to the control of multistage fluid separation processes and systems. The processes and systems employ at least one recycle compressor or pumping means with their associated control means to separate a fluid mixture in an efficient manner during off demand or turn-down conditions. The operation of at least one compressor or pumping means is controlled such that the pressure in the permeate side of a membrane unit or module can be maintained at a set value. This in turn allows for the maintenance of the desired pressure ratio across the membrane, as well as the desired reduction in power consumption during off demand or turn-down conditions. The utilization of at least one recycle compressor or pumping means with their associated control means also enables multi-stage fluid separation systems and processes to produce a product at a desired quality (purity) and quantity (product flow rate) even when the quantity of the product recovered is changed according to varied product demands.

Figure 1:
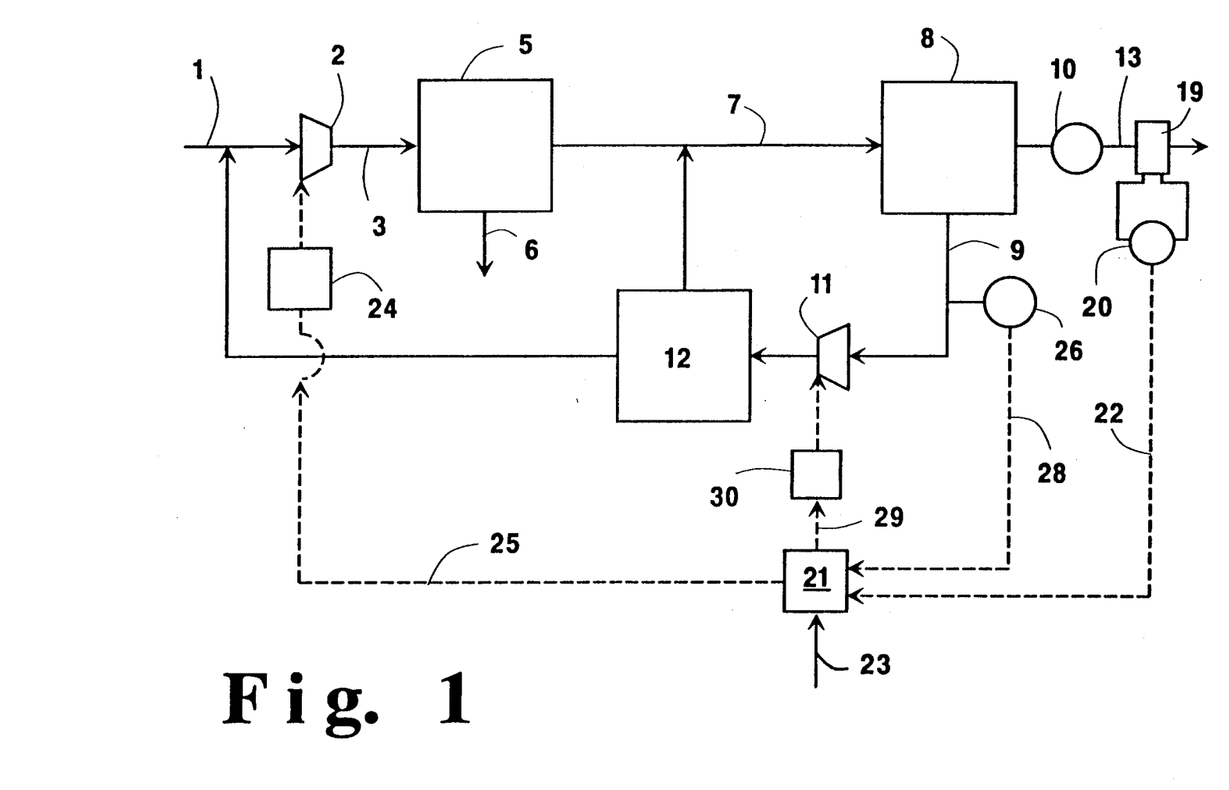
FIGS. 1, 2 and 3 illustrate multi-stage membrane systems and their associated control means, which are useful for separating fluid efficiently during off demand or turn-down conditions.
Figure 2:
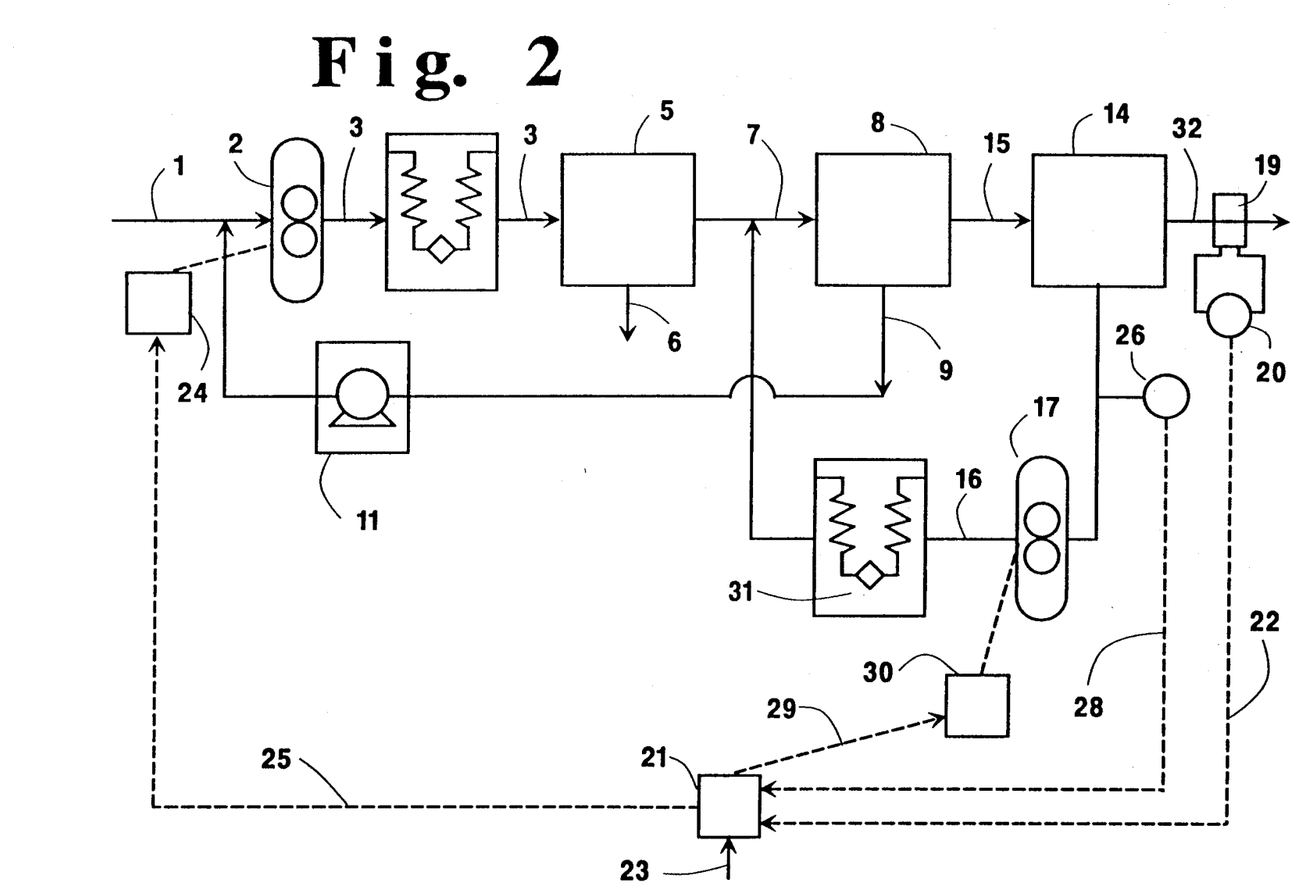
Figure 3:
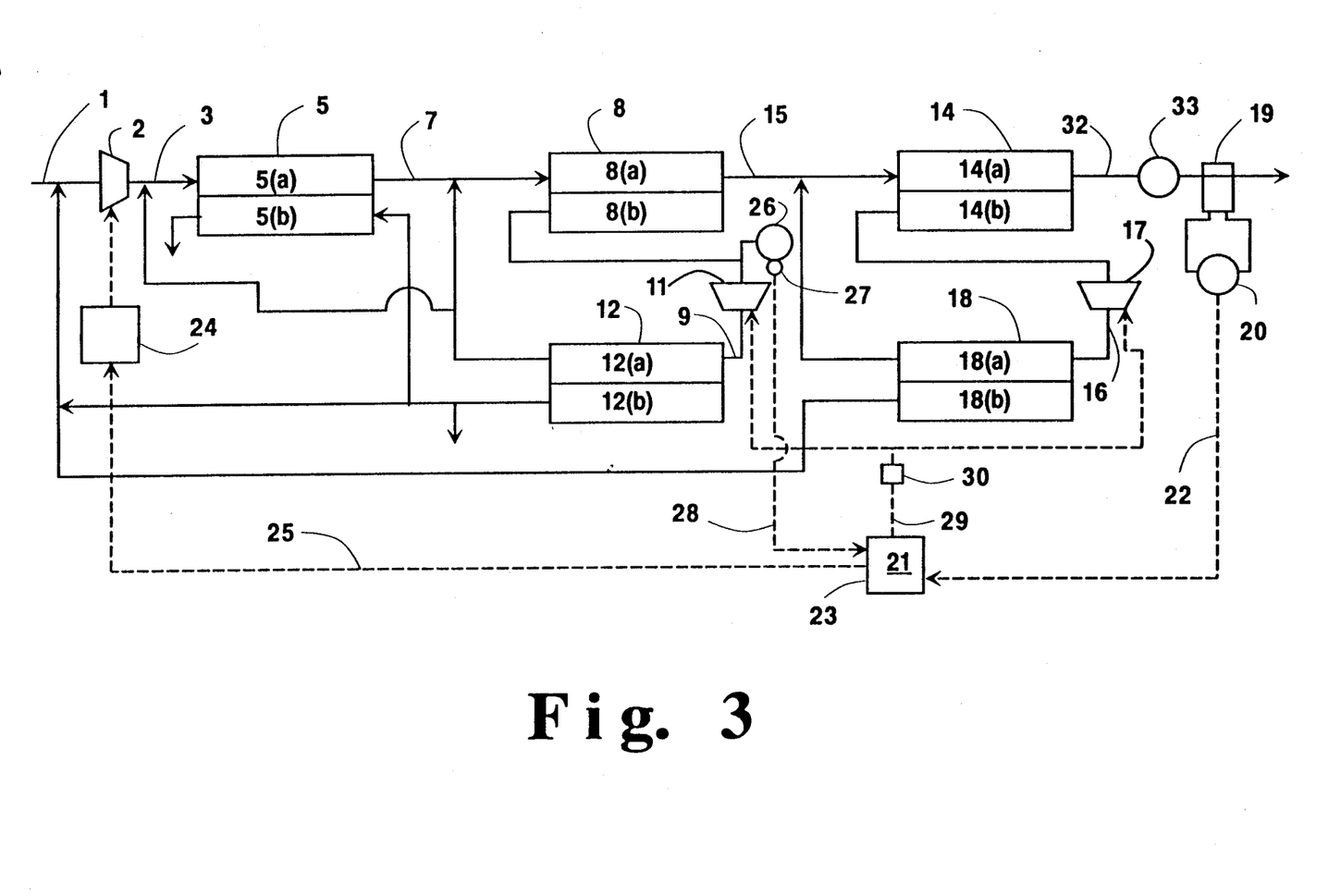

Now referring to the drawings, FIGS. 1-3 illustrate multi-stage membrane systems comprising at least three membrane units or modules, with at least two of the units or modules being connected in series. Each unit or module has a membrane having non-permeate and permeate sides so that at least one component of any fluid mixture can permeate through the membrane from the non-permeate side to the permeate side.

In practice, inlet line (1) is used to introduce a fluid mixture into the membrane units or modules of the multi-stage membrane systems. The fluid mixture fed to the inlet line (1) is initially routed to inlet compressor or inlet pumping means (2) from which pressurized fluid mixture is delivered to first stage membrane unit or module (5) through line (3). At least one cooling means (4) may be optionally employed to remove heat from the fluid mixture before it is delivered to the first stage membrane unit or module (5). In the first stage membrane unit or module (5), at least a portion of the unwanted component(s) of the fluid mixture is permeated to the permeate side (5b) and is discarded through line (6). The remaining fluid mixture in the non-permeate side (5a) having a pre-selected purity or dry level at essentially feed pressure flows through line (7) into the non-permeate side (8a) of second stage membrane unit or module (8). The unwanted component(s) of the fluid mixture is permeated to the permeate side (8b) of the second stage membrane unit or module (8) with some of the desired component(s) of the fluid mixture, until the non-permeate fluid attains the desired purity or dry level. The permeated fluid in the permeate side (8b) is directed to at least one of the lines (1, 3 and 7) through a recycling conduit (9). The recycling fluid in the recycling conduit (9) is compressed with a recycle compressor or pumping means (11) and may be cooled in a cooling means (not shown). The pressure of the permeate side (8b) of the second stage membrane unit or module (8) is substantially the same as the suction pressure of the recycle compressor or pumping means. The pressurized fluid in the recycling conduit (9) may be separated to produce permeate and non-permeate fluid streams having particular purity levels by using third stage membrane unit or module (12) located at the recycling conduit (9), as shown by FIG. 1. The permeated stream in the permeate side (12b) of the module or unit (12) may be discarded or sent to the inlet line (1) or the permeate side of the first stage membrane unit or module. In the mean time, the remaining fluid in the non-permeate side (12a) is delivered to at least one of the lines (3 and 7) so that at least a portion of the non-permeate stream from the second stage membrane unit or module can be recovered through an outlet line (13) having a valve (10) as a product stream. As a substitute or addition to the third stage membrane unit or module (12), membrane unit or module (14), as shown by FIGS. 2 and 3, can be utilized. The membrane unit or module (14) is connected with the non-permeate side of the second membrane unit or module (8) with line (15) so that at least a portion of the non-permeate fluid stream from the second stage membrane unit can be received in the non-permeate side (14a) of the membrane unit or module (14) at an elevated pressure. Upon receiving the non-permeate stream from the second stage membrane unit or module, it is further separated into permeate and non-permeate streams having the desired qualities (purity). The permeate stream in the permeate side (14b) is recycled through a recycle conduit (16) to at least one of the lines (1, 3, 7, 9, and 15). The recycling fluid in the conduit (16) is recompressed with a recycle compressor or pumping means (17) and may be cooled with an on-line cooling means (31) prior to its introduction into at least one of the lines. Optionally, an additional membrane unit or module (18), as shown by FIG. 3, may be employed at the conduit (16) to separate the compressed recycling fluid into non-permeate and permeate streams by permeating the fluid from the non-permeate side thereof (18a) to the permeate side thereof (18b) until the non-permeate fluid product has the desired purity. The non-permeate fluid stream from the membrane unit or module (18) is recycled to at least one of the lines (7 and 15) while the permeate fluid stream from the membrane unit or module (18) is recycled to at least one of the lines (1, 3 and 9) or to the permeate side of the first stage membrane unit or module. As the permeate stream from the membrane unit or module (14) is being recycled back to the proceeding lines with or without the use of the optional membrane unit (18), at least a portion of the non-permeate stream is recovered as the product through an outlet line (32) having an optional valve (33). It is possible to use additional membrane stages (not shown) to further purify or dry the non-permeate product stream from the membrane unit or module (14). The desired product can be recovered from one or more membrane stages including the second, third and/or the last stage depending on the desired product quality and/or the location of fluid mixture inlet line(s). It should be understood that any number of fluid mixture inlet lines and fluid product outlet lines may be used at any location so long as the desired amount of a product having the desired quality can be recovered from using those inlet and outlet lines.

To operate the above membrane systems under varying product demand or turn-down conditions, means (19) for monitoring and/or sensing the pressure, flow rate and/or purity of the product is placed at the product outlet line (13 or 32) of the membrane systems. The monitoring and/or sensing means (19), such as a flow meter, a gas analyzer and/or a pressure sensor, has a conventional transmitter (20) associated therewith to send an input signal (process variable signal) to a process control system (21), such as a process computer or an analog controller, through an appropriate electrical, mechanical, hydraulic or pneumatic connection represented by the numeral (22). Thus, the monitoring and/or sensing means (19) is used to monitor product flow, product pressure and product purity and the transmitter (20) is employed to send a process variable signal, i.e., a signal proportional to the product flow, product pressure and/or product purity, to the process control system (21). Also employed as an input to the process control system (21) is a purity set point, represented by the numeral (23), that can be varied depending upon the product purity requirements of the operation.

The process control system (21), such as a conventional process computer system or a conventional analog control system, is either programmed or designed to send an output signal to capacity control device (24) that is used to turn down compressor, by an appropriate mechanical or electrical connection, represented by the numeral (25) by adjustment of the appropriate recycle valve, suction valve, variable speed motor or the like, to the pressure and/or flow conditions appropriate for the indicated demand conditions. The process control system, such as a process computer system, is highly flexible in that, as the design conditions change, as a result of differences in process application, improvements in membrane performance, and the like, the process control system can readily be reprogrammed to match the new design conditions of the different or modified process application.

Those skilled in the art will appreciate that the desired product purity can often be a variable input from the downstream operation for which the product gas or liquid is being produced in the membrane system being controlled. As the product flow is cut back, product purity will start to rise, and the process control system will sense this rise and cut back the compressor loading. It should be noted, however, that the use of product purity as the primary measurement can result in a certain element of instability in some cases as a result of the inherent lag time involved in the collection and analysis of product purity. By contrast, it is readily possible to achieve instant monitoring of product flow changes or product pressure changes.

Generally, the operation of the inlet compressor or pumping means can be varied to produce the required flow at the desired purity based on the measurement of the product flow, product pressure and/or product purity and based on the required purity setting.

Figure 4:
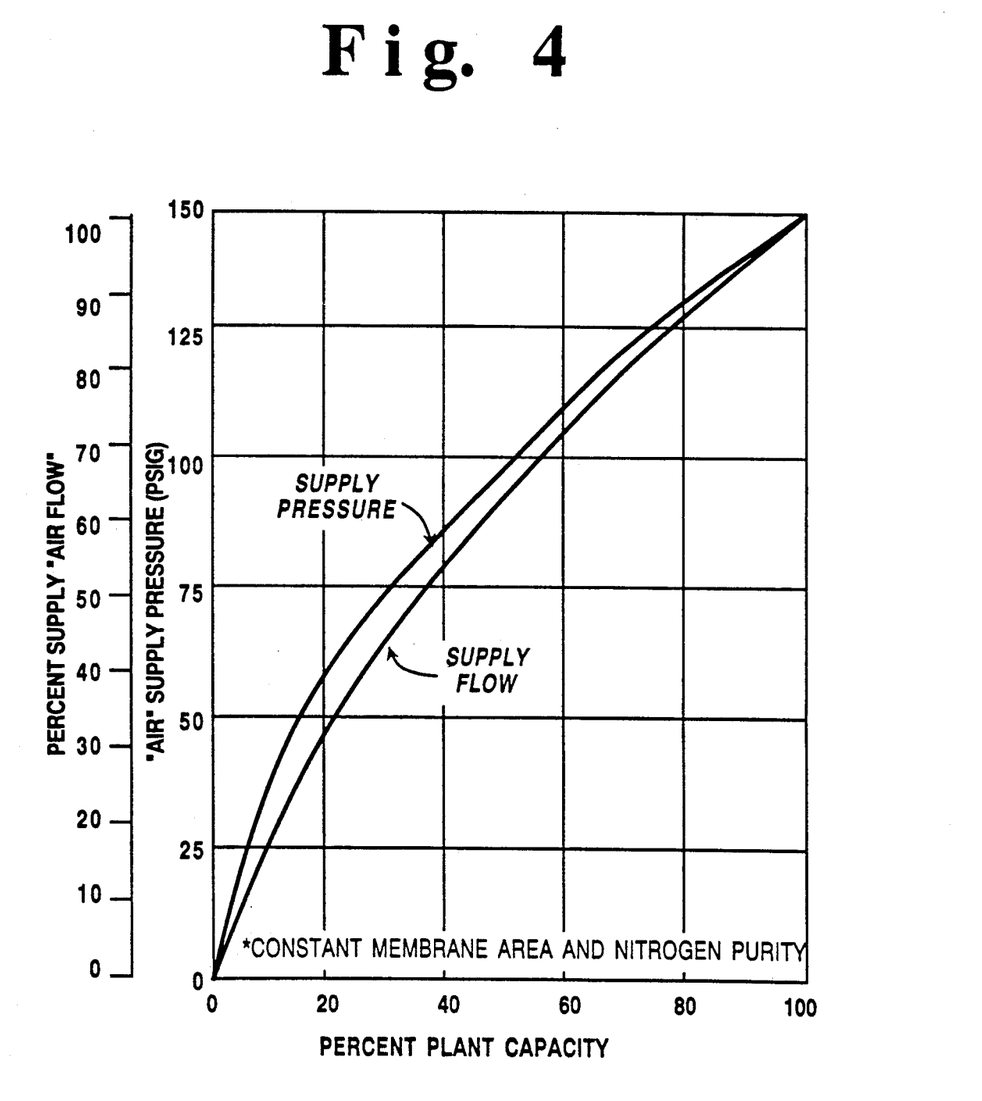
FIG. 4 illustrates how the supply air flow and pressure vary with turndown in the design membrane plant capacity.

During the turn-down of the above membrane systems, however, the system operating pressure falls as shown in FIG. 4. As the system operating pressure falls, the permeate flow rates are reduced as a result. In other words, the fluid directed to the recycle compressor or pumping means (11 and/or 17) is reduced. If the recycle compressor or pumping means, such as a positive displacement compressor, is operating at constant inlet volume and the permeate flow rate is reduced, the inlet pressure of the compressor will also fall to allow a small quantity of fluid to fill a larger volume. Consequently, the pressure ratio across the compressor will rise and result in higher power consumption and the purity of the product gas will undergo a change.

To enhance the operation of the above membrane system during varied product demand or turn-down conditions, additional means (26) for monitoring and/or sensing the pressure, flow rate and/or purity level of the permeate fluid in the recycle conduit (9 and/or 16) is employed. The monitoring and/or sensing means (26) may be a flow meter, a gas analyzer and/or a pressure sensor. Of these, monitoring and sensing means the pressure sensor is most preferred since it can achieve instant monitoring of the pressure changes in the permeate side of the membrane unit or module associated with recycle conduit. The monitoring and/or sensing means may have a conventional transmitter (27), if necessary, to send an input signal (process variable signal) to the process control system (21) through an appropriate electrical, mechanical, pneumatic or hydraulic signal transmitting means (28). During off demand or turn-down conditions, the permeate fluid pressure or flow is monitored. Based on the monitored and/or sensed value, the transmitter transmits a corresponding process variable signal, i.e., a signal proportional to the product pressure and/or flow, to the process control system (21). The control system (21) is also adapted (programmed, designed, etc...) to receive the process variable signal and to transmit a corresponding output signal through an appropriate signal transmitting means (29) to a control means (30) for controlling and/or adjusting the capacity of the recycle compressor or pumping means (11 and/or 17) to comport with varying product fluid demand conditions or with the reduced permeate fluid pressure or flow entering the inlet of the recycle compressor or pumping means (11 and/or 17). The control means (30), for example, controls the compressor displacement or the compressor speed to adjust the capacity of the recycle compressor. By adjusting the capacity of the compressor, the permeate side of the membrane unit or module, which is in fluid communication with the recycle compress can be maintained at a set pressure. This, in turn, allows for the maintenance of the desired pressure ratio across the membrane, as well as the desired reduction in power consumption during off demand or turn down conditions.

In an illustrative air separation operation, the three stage membrane separation system of FIG. 2 is designed to operate at full demand conditions. The system is optimized to operate at an air supply pressure of about 165 psia and to produce about 10,000 ncfh of high purity nitrogen containing about 3% oxygen. If the system is operated at about 60% of capacity during off demand or turn-down conditions, approximately 68% by volume of the design air flow is required. As shown by FIG. 4, a supply air pressure of about 110 psia is needed to fully utilize the available membrane area and to obtain nitrogen having the design purity level. Although FIG. 4 illustrates the relationship between a particular air supply pressure and a particular air flow and a particular membrane plant design, the relationship and effect thereof during turn-down are applicable to other sets of conditions. The shapes of the curve in FIG. 4, however, may change somewhat under different sets of conditions.

In another illustrative embodiment, the membrane system of FIG. 2 is optimized at full demand conditions to operate at an air supply pressure of about 165 psia and produce about 10,000 ncfh of high purity nitrogen having the desired purity. At 55% turn-down, the feed air flow, high purity nitrogen product flow and product pressures are reduced. The third stage pressure of the membrane system permeate, however, is maintained at about 15 psia. The quality of a high purity nitrogen product is unchanged as shown by Table I. Thus, the recycle compressor can be operated at minimum power. The available membrane area is also fully utilized.

TABLE 1

|  | Design Capacity | 55% Turndown |
|---|---|---|
| $Y_0$ (% by volume) | 20.9% | 20.9% |
| $P_0$ (PSIA) | 14.5 | 14.5 |
| $P_1$ (PSIA) | 165 | 115 |
| $F_6$ (NCFH) | 10,000 | 5,520 |
| $P_6$ (PSIA) | 159 | 109 |
| $Y_6$ (%) | 0.1% | 0.1% |
| $F_7$ (NCFH) | 18,500 | 11,945 |
| $P_7$ (PSIA) | 15.0 | 15.0 |

$Y_0$ = The oxygen concentration of air introduced in the inlet line (1)

$P_0$ = The pressure of air introduced in the inlet line (1)

$P_1$ = The air pressurized with the inlet compressor (2).

$F_6$ = The flow rate of high purity nitrogen product in the outlet line (32).

$P_6$ = The pressure of high purity nitrogen product in the outlet line (32).

$Y_0$ = The oxygen concentration of high purity nitrogen in the outlet line (32).

$F_1$ = The flow rate of a permeate stream leaving the permeate side (14a) of the last membrane stage (14).

$P_9$ = The pressure of a permeate stream leaving the permeate side (14a) of the last membrane stage (14).

Figure 5:
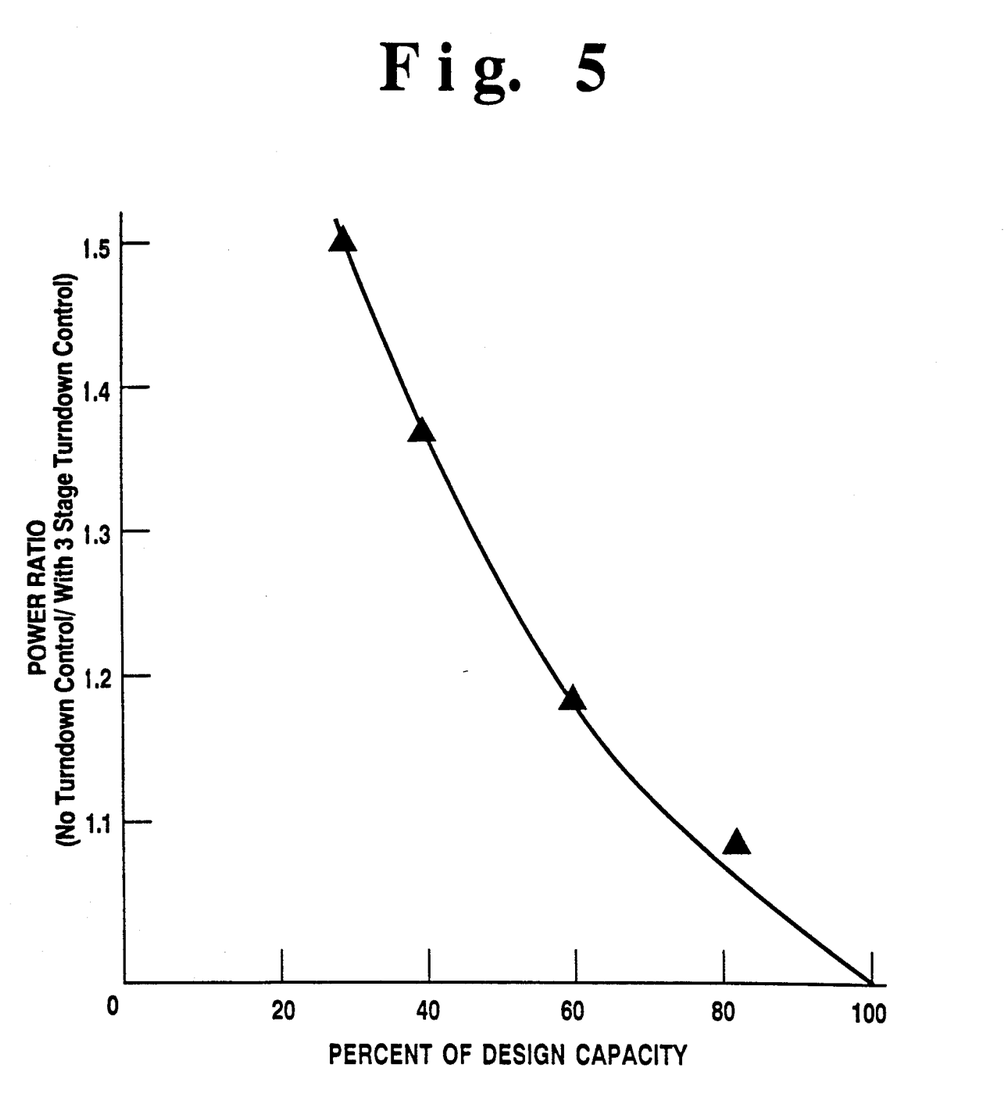
FIG. 5 illustrates the power requirements for separating air in the membrane system of FIG. 2 with or without its associated control means.

FIG. 5 also illustrates the benefit of the present invention. For example, FIG. 5 shows that a membrane plant operating at about 60% of capacity without the benefit of the invention would use about 18% more power than the same plant utilizing the invention.

The amount of energy savings achieved upon turndown can also depend upon the type of compression equipment employed in the practice of the invention. It will be understood that a variety of capacity control means are available in the art depending on the type of compression equipment employed. Variable speed motors, internal recycle valves, and suction valve unloaders are examples of the available devices that can be used to turndown compression equipment in accordance with the invention.

It is within the scope of the invention to practice the turndown method herein described and claimed in a wide variety of fluid separation operations, of which the air separation for nitrogen production embodiment referred to above is an illustrative example in which turndown conditions are encountered. Such operations include in which a permeable membrane system can be effectively employed to separate a more readily permeable component from a fluid mixture thereof with a less permeable component. A hydrogen-containing off-gas, as from a desulfurization unit, is an example of another suitable feed stream for use in permeable membrane operations, and for the turndown control method of the invention. The recovery of hydrogen from ammonia purge gas, and carbon dioxide and methane separations, are illustrative examples of other commercial fluid separation operations to which the turndown method of the invention can be applied in appropriate circumstances. It should also be noted that, while the air separation application is described above with respect to the convenient discharge of the permeate oxygen stream at atmospheric pressure, other suitable and preferred pressure conditions will pertain in various other embodiments of the invention. In some instances, it may be desirable to utilize an available feed pressure under turndown conditions, with the driving force reduction across the membrane being accomplished by increasing the permeate pressure rather than by decreasing the feed gas pressure. The product purity and/or product recovery achieved will, of course, vary somewhat depending upon the overall requirements of any given membrane separation operation.

The turndown control of the invention can be used with respect to any desired permeable membrane system. Thus, the membrane material employed can be any suitable material capable of selectively permeating a more permeable component of a gas or other fluid mixture, e.g. cellulose derivatives such as cellulose acetate, cellulose acetate butyrate, and the like; polyamides and polyimides, including aryl polyamides and aryl polyimides; polysulfones; polystyrenes and the like. It should also be noted that it is within the scope of the invention to employ permeable membranes of any desired configuration. Thus, the permeable membrane may be in composite form, having a separation layer that determines the selectivity and permeability characteristics of the membrane positioned on a porous support layer. Asymmetric-type membranes, in which a relatively dense surface region determines the selectivity and permeability characteristics of the membrane and a more porous region provides support, can also be employed. Other forms of membranes, e.g. dense membranes, are also useful for particular applications. The permeable membranes, for purposes of the invention, can be in any desired form, such as flat sheet, hollow fiber, spiral wound, or other desired form, with hollow fiber membranes being generally preferred. Hollow fibers or other desired forms of membrane material are generally assembled into membrane modules comprising hollow fiber bundles, pleated flat sheet membrane assemblies, or spiral wound cartridges, having feed inlet and permeate exit sides, with conduit means being provided for the separate removal of the non-permeate portion of the feed stream and for the removal of the permeate portion thereof. All such systems can be effectively turned down in accordance with the invention, with the installed membrane surface being fully utilized under all operating conditions.

Although the invention has been described with reference to specific embodiments as examples, it will be appreciated that it is intended to cover all modifications and equivalents within the scope of the appended claims.

What is claimed is:

1. A multi-stage permeable membrane fluid separation process, said process comprising:
    (a) introducing a fluid feed stream into at least one-first membrane unit having a membrane at a pressure sufficient to permeate at least one fluid component of said fluid feed stream to produce first non-permeate and permeate streams;
    (b) passing at least a portion of said first non-permeate stream from said at least one-first membrane unit into at least one-second membrane unit having a membrane at a pressure sufficient to produce second non-permeate and permeate streams;
    (c) delivering said second permeate stream from said at least one-second membrane unit into at least one-third membrane unit having a membrane via a recycle compressor or pumping means having a control means to provide a pressure sufficient to produce third non-permeate and permeate streams;
    (d) combining at least portion of said third non-permeate stream with said fluid feed stream, said first non-permeate stream and/or said second non-permeate stream;
    (e) monitoring and/or sensing the pressure, flow rate and/or purity of said second permeate stream;
    (f) transmitting a process variable signal corresponding to the sensed and/or monitored pressure, flow rate and/or purity of said second permeate stream to a process control system adapted to transmit a corresponding output signal to said control means to control the operation of said recycle compressor or pumping means;
    (g) varying or reducing the flow rate of said fluid feed stream into said at least one-first membrane in response to varied or reduced product demands;
    (h) adjusting or reducing the capacity of said recycle compressor or pumping means with said control means in response to the monitored and/or sensed pressure, flow rate and/or purity of said second permeate stream moving toward said recycle compressor or pumping means so that a constant pressure or a substantially constant pressure at the permeate side of said at least one second membrane is maintained; and
    (i) recovering a pre-selected quantity of said second non-permeate stream as a product or passing a pre-selected quantity of said second non-permeate stream to additional membrane units to recover a further purified product.

2. A multi-stage permeable membrane fluid separation process, said process comprising:
    (a) introducing a fluid feed stream into at least one-first membrane unit having a member at a pressure sufficient to permeate at least one fluid component of said fluid feed stream to produce first non-permeate and permeate streams;
    (b) passing said first non-permeate stream from said at least one-first membrane unit into at least one. second membrane unit having a membrane at a pressure sufficient to produce second non-permeate and permeate streams;
    (c) delivering said second non-permeate stream from said at least one-second membrane unit into at least one-third membrane unit having a membrane to produce third non-permeate and permeate streams;
    (d) recycling said third permeate stream with a recycle compressor or pumping means having a control means to combine at least a portion of said third permeate stream with said second non-permeate stream, said first non-permeate stream and/or said fluid feed stream;
    (e) monitoring and/or sensing the pressure, flow rate and/or purity of said third permeate stream;
    (f) transmitting a process variable signal corresponding to the sensed and/or monitored pressure, flow rate and/or purity of said third permeate stream to a process control system adapted to transmit a corresponding output signal to said control means to control the operation of said recycle compressor or pumping means;
    (g) varying or reducing the flow rate of said fluid feed stream into said at least one-first membrane in response to varied or reduced product demands;

(h) adjusting or reducing the capacity of said recycle compressor or pumping means with said control means in response to the monitored and/or sensed pressure, flow rate and/or purity of said third permeate stream moving toward said recycle compressor or pumping means so that a constant pressure or a substantially constant pressure at the permeate side of said third and/or last membrane unit is maintained; and (i) removing a pre-selected quantity of said third non permeate stream from said at least one-third membrane unit.

3. The multi-stage permeable membrane fluid separation process according to claim 2, further comprising passing at least a portion of said third permeate stream to at least one-fourth membrane unit having a membrane to produce fourth non-permeate and permeate streams, prior to being combined with said second non-permeate stream, said first non-permeate stream and/or said fluid feed stream, so that at least a portion of said fourth non-permeate stream is combined with said second non-permeate stream and/or said first non-permeate stream.

4. The multi-stage permeable membrane fluid separation process according to claim 2, wherein said fluid feed stream is air or hydrogen containing gases.

5. The multi-stage permeable membrane fluid separation process according to claim 2, further comprising cooling at least a portion of said third permeate stream from said recycle compressor or pumping means prior to combining said at least a portion with said second non-permeate stream, said first non-permeate stream and/or said fluid feed stream.

6. A multi-stage permeable membrane system capable of separating at least one fluid component from a fluid mixture, said system comprising:

(a) at least three membrane units, with at least two of said at least three membrane units being connected in series, said at least three membrane units each comprised of a membrane having non-permeate and permeate sides, said membrane being capable of permeating at least one fluid component of the fluid mixture from the non-permeate side of the permeate side;

(b) fluid inlet means for introducing the fluid mixture into the non-permeate side of any one of said at least three membrane unit in series;

(c) product outlet means for withdrawing product fluid from a non-permeate side of the second, third and/or last membrane unit in series;

(d) recycle conduit means selected from the group consisting of a first recycle conduit for passing fluid from the permeate side of said third membrane unit and/or said last membrane unit to the non-permeate side of at least one of said membrane units and a second recycle conduit for passing fluid from the permeate side of said second membrane unit to the non-permeate side of said membrane unit and then passing fluid from the non-permeate side of said third membrane unit to the non-permeate side of at least one of said membrane units;

(e) recycle compressor or pumping means for pumping or compressing fluid in said first recycle conduit or in said second conduit;

(f) control means for controlling or adjusting the operation of said recycle compressor or pumping means;

(g) means for sensing and/or monitoring the pressure, flow rate and/or purity of fluid in said first recycling conduit or said second recycling conduit; and (h) at least one process control system adapted to receive a process variable signal corresponding to the sensed and/or monitored pressure, flow rate and/or purity of fluid in said first recycling conduit or said second recycling conduit from said means for sensing and/or monitoring and to transmit a corresponding output signal to said control means for controlling or adjusting the operation of said recycle compressor or pumping means to vary the capacity of said recycle compressor or pumping means to comport with varying product fluid demand conditions, whereby a constant pressure or a substantially constant pressure can be maintained at the permeate side of said second, third and/or last membrane unit.

7. The multi-stage permeable membrane system according to claim 6, further comprising an additional compressor or pumping means for compressing or pumping fluid in said fluid inlet means; additional control means for actuating and/or adjusting the operation of said additional compressing or pumping means; and means for sensing and/or monitoring the pressure, flow rate and/or purity of product fluid in said product outlet means, wherein said at least one process control system is also adapted to receive a process variable signal corresponding to the sensed and/or monitored pressure, flow rate and/or purity of product fluid in said product outlet means from said means for sensing and/or monitoring and to transmit a corresponding output signal to said additional control means for adjusting the operation of said additional compressor or pumping means to increase or decrease the flow rate and/or pressure of the fluid mixture in said fluid inlet means to comport with varying product fluid demand conditions, whereby the available membrane surface area is fully utilized or substantially fully utilized under said varying product fluid demand conditions.

8. The multi-stage permeable membrane system according to claim 6, further comprising at least one-fourth membrane unit located at said first recycling conduit so that the non-permeate side of said at least one-fourth membrane unit is in communication with the non-permeable side of at least one of said membrane units.

* * * * *